*(12)* United States Patent
Sugahara

(10) Patent No.: US 10,194,050 B2
(45) Date of Patent: Jan. 29, 2019

(54) IMAGE PROCESSING APPARATUS, IMAGE PROCESSING METHOD, AND STORAGE MEDIUM IN WHICH BACKGROUND REMOVAL IS PERFORMED TO REMOVE A BACKGROUND INCLUDED IN AN INPUT IMAGE BASED ON PIXEL VALUES

(71) Applicant: CANON KABUSHIKI KAISHA, Tokyo (JP)

(72) Inventor: Asako Sugahara, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/396,935

(22) Filed: Jan. 3, 2017

(65) Prior Publication Data

US 2017/0201648 A1 Jul. 13, 2017

(30) Foreign Application Priority Data

Jan. 13, 2016 (JP) ................. 2016-004764

(51) Int. Cl.
*H04N 1/38* (2006.01)
*H04N 1/405* (2006.01)
*H04N 1/60* (2006.01)
*H04N 1/407* (2006.01)
*H04N 1/409* (2006.01)
*H04N 1/58* (2006.01)
*H04N 1/62* (2006.01)

(52) U.S. Cl.
CPC ............. *H04N 1/38* (2013.01); *H04N 1/405* (2013.01); *H04N 1/407* (2013.01); *H04N 1/4092* (2013.01); *H04N 1/58* (2013.01); *H04N 1/6008* (2013.01); *H04N 1/6019* (2013.01); *H04N 1/6027* (2013.01); *H04N 1/62* (2013.01); *H04N 2201/0094* (2013.01)

(58) Field of Classification Search
CPC .......... H04N 1/38; H04N 1/405; H04N 1/407; H04N 1/4092; H04N 1/58; H04N 1/6008; H04N 1/6019; H04N 1/6027; H04N 1/62; H04N 2201/0094
USPC ....................... 358/3.26, 1.9, 1.15
See application file for complete search history.

(56) References Cited

U.S. PATENT DOCUMENTS

| 7,274,486 | B2 | 9/2007 | Takahashi et al. | |
| 8,023,157 | B2 | 9/2011 | Takahashi et al. | |
| 2002/0027670 | A1 | 3/2002 | Takahashi et al. | |
| 2007/0297668 | A1* | 12/2007 | Matsuzaki | ............... H04N 1/56 382/163 |

(Continued)

FOREIGN PATENT DOCUMENTS

JP 2002-077607 A 3/2002

*Primary Examiner* — Quang N Vo
(74) *Attorney, Agent, or Firm* — Venable LLP

(57) ABSTRACT

An image processing apparatus includes a first determination unit to determine an attribute of an area included in an input image obtained by reading a document, a second determination unit to determine saturation of an area determined to be a halftone dot area by the first determination unit, and a background removal unit to remove a background included in the input image. The background removal unit converts for an area determined to be a halftone dot area by the first determination unit and whose value indicating saturation is determined to be less than a predetermined value by the second determination unit, a color of a pixel of pixels making up the area, which has a pixel value greater than a first level, into white.

7 Claims, 9 Drawing Sheets

(56) References Cited

U.S. PATENT DOCUMENTS

| | | |
|---|---|---|
| 2008/0094647 A1 | 4/2008 | Takahashi et al. |
| 2009/0033964 A1* | 2/2009 | Kubota .................. H04N 1/38 |
| | | 358/1.9 |
| 2015/0254032 A1 | 9/2015 | Sugahara |

* cited by examiner

IMAGE PROCESSING APPARATUS, IMAGE PROCESSING METHOD, AND STORAGE MEDIUM IN WHICH BACKGROUND REMOVAL IS PERFORMED TO REMOVE A BACKGROUND INCLUDED IN AN INPUT IMAGE BASED ON PIXEL VALUES

BACKGROUND OF THE INVENTION

Field of the Invention

The present invention relates to a technique to remove an unnecessary background on a scanned image at the time of copying a document.

Description of the Related Art

In general, in copy processing in an image forming apparatus, such as a Multi Function Peripheral (MFP), in order to reproduce a document to be copied faithfully, various kinds of image processing are performed for an image (scanned image) obtained by reading the document by a scanner. At this time, it is preferable for so-called show-through, which is a phenomenon in which an image on the backside of a document shows through, not to be reproduced faithfully. Further, for example, in the case where a document to be copied is newspaper, it is rather preferable not to faithfully reproduce the color (background color) of the paper itself. As described above, on a scanned image, unnecessary background information (hereafter, called "unnecessary background") that a user does not intend to print may also be included. As a representative function to remove such an unnecessary background, there is a background removal function. In the general background removal, in the case where the signal value of each color is greater than or equal to a predetermined value, processing to convert the signal value into a value corresponding to white is performed. convert the signal value into a value corresponding to white is performed.

Here, there is such a problem that even a highlight area that should be left originally is removed along with the unnecessary background within the scanned image by the above-described background removal function. For this problem, a method has been proposed, in which a halftone dot portion within a scanned image is determined and the background is removed only in the case where the portion is not a halftone dot and the density is lower than or equal to a fixed density (see Japanese Patent Laid-Open No. 2002-77607).

With the technique disclosed in Japanese Patent Laid-Open No. 2002-77607 described above, the halftone dot portion within the scanned image is not removed. Because of this, for example, in the case where part of a show-through portion is determined to be a halftone dot, there arises such another problem that the show-through portion is left as unevenness.

SUMMARY OF THE INVENTION

The image processing apparatus according to the present invention includes a first determination unit configured to determine an attribute of an area included in an input image obtained by reading a document, and a second determination unit configured to determine saturation of an area determined to be a halftone dot area by the first determination unit and a background removal unit configured to remove a background included in the input image, wherein the background removal unit converts: for an area determined to be a halftone dot area by the first determination unit and whose value indicating saturation is determined to be less than a predetermined value by the second determination unit, a color of a pixel of pixels making up the area, which has a pixel value greater than a first level, into white and for an area determined to be a halftone dot area by the first determination unit and whose value indicating saturation is determined to be greater than or equal to the predetermined value by the second determination unit, a color of a pixel of pixels making up the area, which has a pixel value greater than a second level, into white, and a pixel value specified by the first level is less than a pixel value specified by the second level.

Further features of the present invention will become apparent from the following description of exemplary embodiments (with reference to the attached drawings).

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

In the following, embodiments for embodying the present invention are explained by using the drawings.

Figure 1:
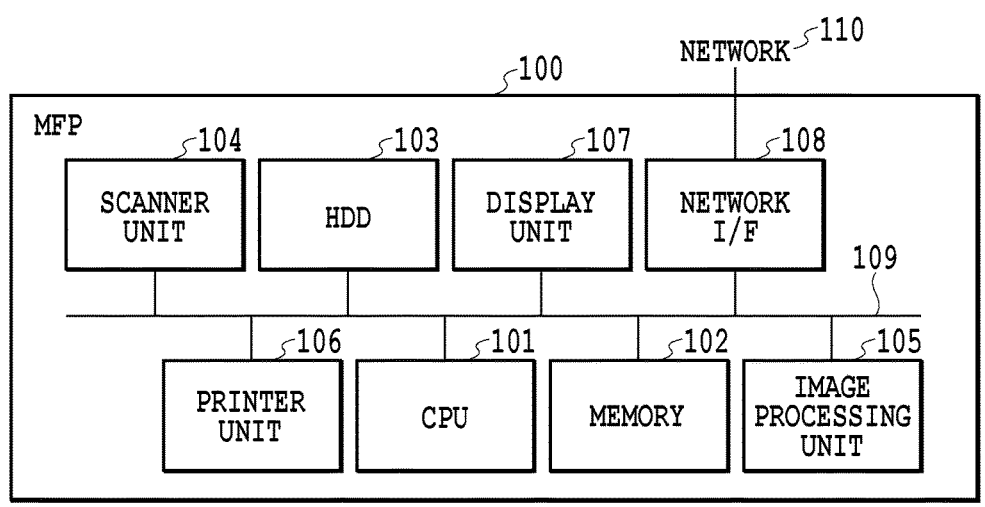
FIG. 1 is a block diagram showing an example of a configuration of Multi Function Peripheral (MFP)

FIG. 1 is a block diagram showing an example of a configuration of an MFP as an image forming apparatus according to the present embodiment.

An MFP 100 includes a CPU 101, a memory 102, an HDD 103, a scanner unit 104, an image processing unit 105, a printer unit 106, and a display unit 107 connected to one another via an internal bus 109 and is connected with a network 110 via a network I/F 108.

The CPU 101 is a processor that centralizedly controls the MFP 100 and controls each unit connected via the internal bus 109.

The memory 102 includes a ROM that stores various commands (including application programs) executed by the CPU 101 to control the MFP 100 and various kinds of data, and a RAM that functions as a work area of the CPU 101.

The scanner unit 104 optically reads a document that is set on a document table or the like, not shown schematically, and acquires scanned image data with a predetermined resolution.

The image processing unit 105 performs necessary image processing for scanned image data or the like acquired by the scanner unit 104. Details of the image processing unit 105 will be described later.

The printer unit 106 has a function to print an image on a printing medium, such as paper.

The HDD 103 temporarily saves scanned image data acquired by the scanner unit 104.

The display unit 107 includes a liquid crystal panel or the like having a touch screen function and gives scan instructions or the like via a screen that is displayed on the display unit 107, in addition to displaying various kinds of information.

The network interface 108 is an interface for performing communication, such as transmission and reception, of print data with a PC (not shown schematically) connected via the network 110, such as a LAN and the Internet.

The components of the image forming apparatus are not limited to the contents described above. For example, it may also be possible to provide an input unit including a mouse, a keyboard, etc., for a user to perform various operations in place of a touch screen, and to the configuration of the image forming apparatus, another component may be appropriately added and the configuration may be appropriately altered.

Figure 2:
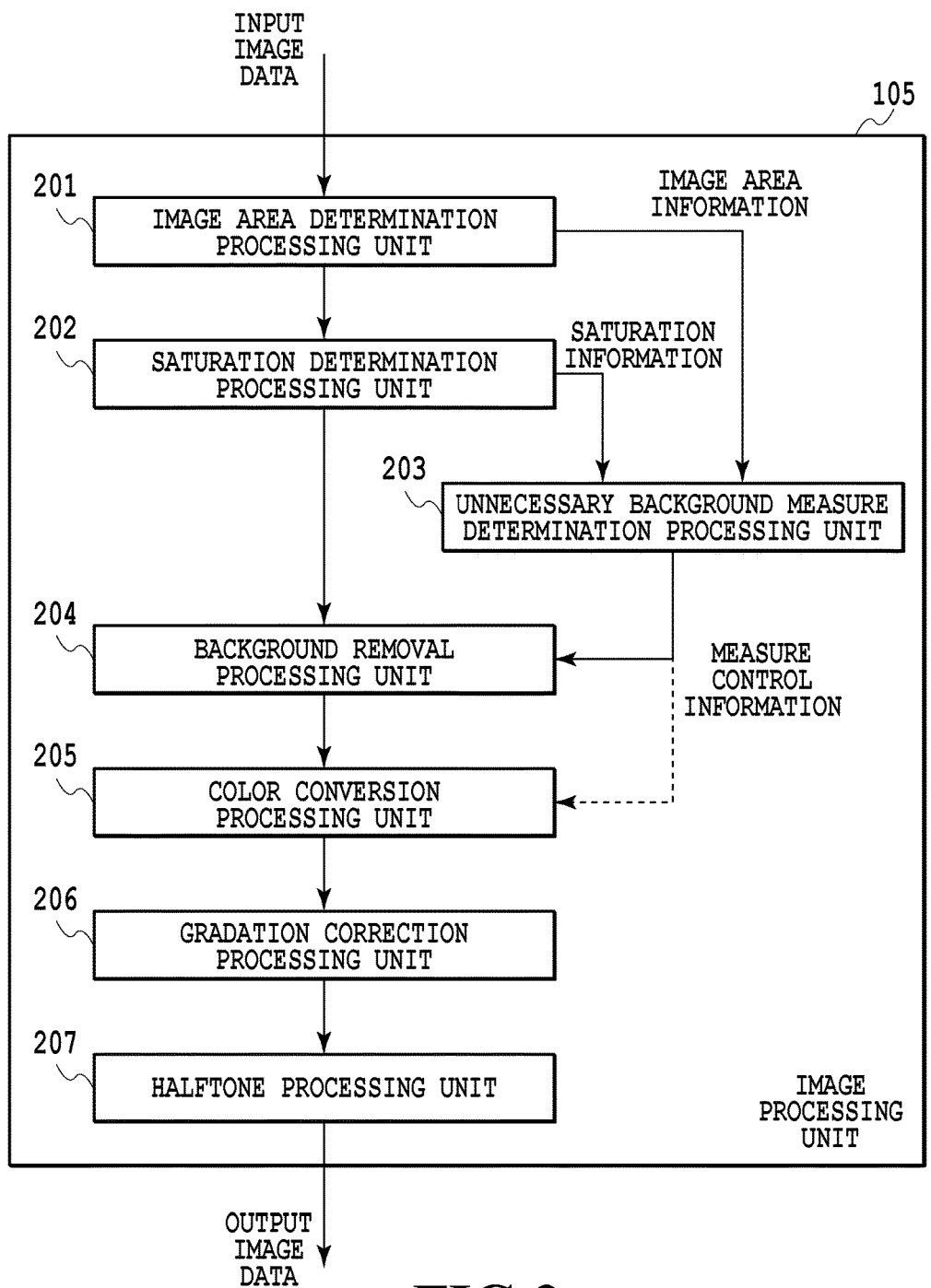
FIG. 2 is function block diagram showing an internal configuration of an image processing unit.

FIG. 2 is a function block diagram showing an internal configuration of the image processing unit 105. The image processing unit 105 includes an image area determination processing unit 201, a saturation determination processing unit 202, an unnecessary background measure determination processing unit 203, a background removal processing unit 204, a color conversion processing unit 205, a gradation correction processing unit 206, and a halftone processing unit 207.

The image area determination processing unit 201 determines the attribute of an object included within a scanned image as an input image for each pixel. The determination results are represented by a flag indicting the contents of each attribute, for example, such as text and photo, as incidental information (image area information) that is given to each pixel. Then, the image area information is used to switch the contents of the image processing in accordance with the object attribute. Here, a photo area drawn in a halftone has a so-called halftone dot structure. Further, a graphics represented in a halftone similarly has a halftone dot structure. Consequently, as information for identifying the attribute of an object, these are together called a "halftone dot". Normally, the area determined to be a "halftone dot" makes up the foreground, and therefore, the information thereof should be left. However, in the case where all the halftone dot areas are uniformly left, the show-through area whose absence is originally desirable is determined to be a halftone dot, and therefore, the show-through area is not removed but is left as unevenness. Regarding this point, the show-through area has the characteristics that the color and the shape are apt to be dulled because the show-through area includes information (image) read from the backside of a document. That is, the color in the case where the show-through area is determined to be a halftone dot is close to an achromatic color. Further, in many cases, the unnecessary background color of newspaper or the like is a dull color without vividness. Consequently, in order to remove the show-through area and the area whose background color is unnecessary from the area(s) determined to be a halftone dot, processing to remove a highlight area whose saturation is less than a fixed value from the entire area(s) (halftone dot area) determined to be a halftone dot is considered to be effective. At this time, it is important to prevent a highlight area whose saturation is higher than or equal to a fixed value from being removed so as to avoid the situation in which the portion of a highlighter pen or the skin color of a person is not reproduced. Consequently, in the present invention, the image processing to remove only the achromatic highlight area (area with a strong possibility of being an unnecessary background) of the halftone dot area(s), specifically, the image processing to increase the lightness of the area is performed as a measure. In the following, for convenience of explanation, a low-saturation color whose saturation is less than a fixed value is called an "achromatic color" and a non-low-saturation color whose saturation is higher than or equal to a fixed value is called a "chromatic color".

The saturation determination processing unit 202 converts the color space (here, RGB) of a scanned image into the device-independent color space (here, $L^*a^*b^*$) and then determines whether each pixel is a chromatic color or an achromatic color. Details of saturation determination processing will be described later.

The unnecessary background measure determination processing unit 203 performs processing (unnecessary background measure determination processing) to determine whether to perform a measure to remove an unnecessary background, such as a show-through portion, based on the results (image area information) of image area determination processing and the results (saturation information) of the saturation determination processing. Details of the unnecessary background measure determination processing will be described later. In the present embodiment, it is supposed to perform an unnecessary background measure in background removal processing using a 1D-LUT (one-dimensional lookup table). Consequently, the results (measure control information) of the unnecessary background measure determination processing are sent to the background removal processing unit 204.

The background removal processing unit 204 performs the background removal processing to remove the background of scanned image data. In the present embodiment, by switching the 1D-LUT that is used for the background removal processing to another in accordance with the measure control information, only the achromatic highlight area is removed while maintaining the chromatic highlight area and thus the show-through portion and the dull background color are removed. Details of the background removal processing will be described later.

The color conversion processing unit 205 converts the color space (here, RGB) of a scanned image into the color space (here, CMYK) dependent on the output side device (printer unit 106).

The gradation correction processing unit 206 corrects the gradation characteristics of each color of CMYK by using the LUT or the like for each color which specifies an output tone level value for an input tone level value.

The halftone processing unit 207 generates print image data (print data) with a number of tone levels (e.g., two) compatible with the printer unit 106 by performing halftone processing using the dither method or the error diffusion method.

Figure 3:
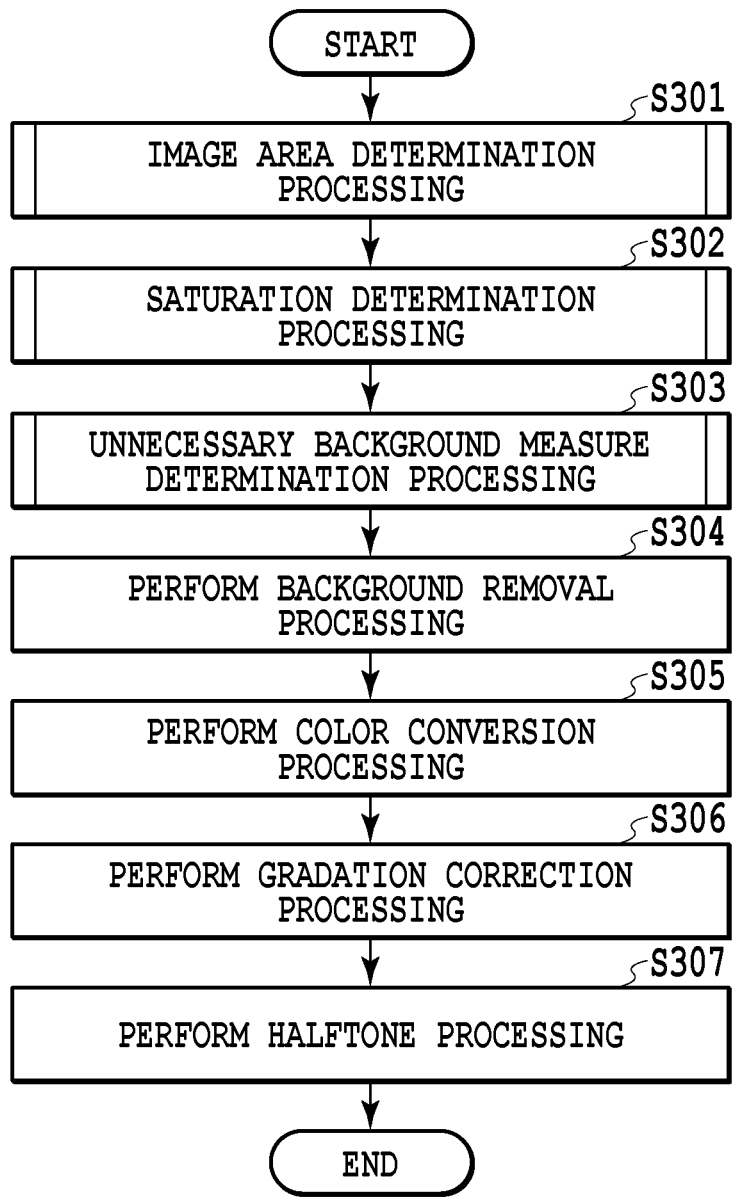
FIG. 3 is a flowchart showing a flow of processing until print data is generated from scanned image data.

Subsequently, a flow of processing in the image processing unit 105 is explained. FIG. 3 is a flowchart showing a flow of processing until print data is generated from input scanned image data in the image processing unit 105. The series of processing is performed by the CPU 101 reading a computer executable program describing a procedure shown below from the ROM onto the RAM and executing the program.

In the case where scanned image data is input to the image processing unit 105, at step 301, the image area determination processing unit 201 generates image area information from a scanned image by performing the image area determination processing.

<Image Area Determination Processing>

Figure 4:
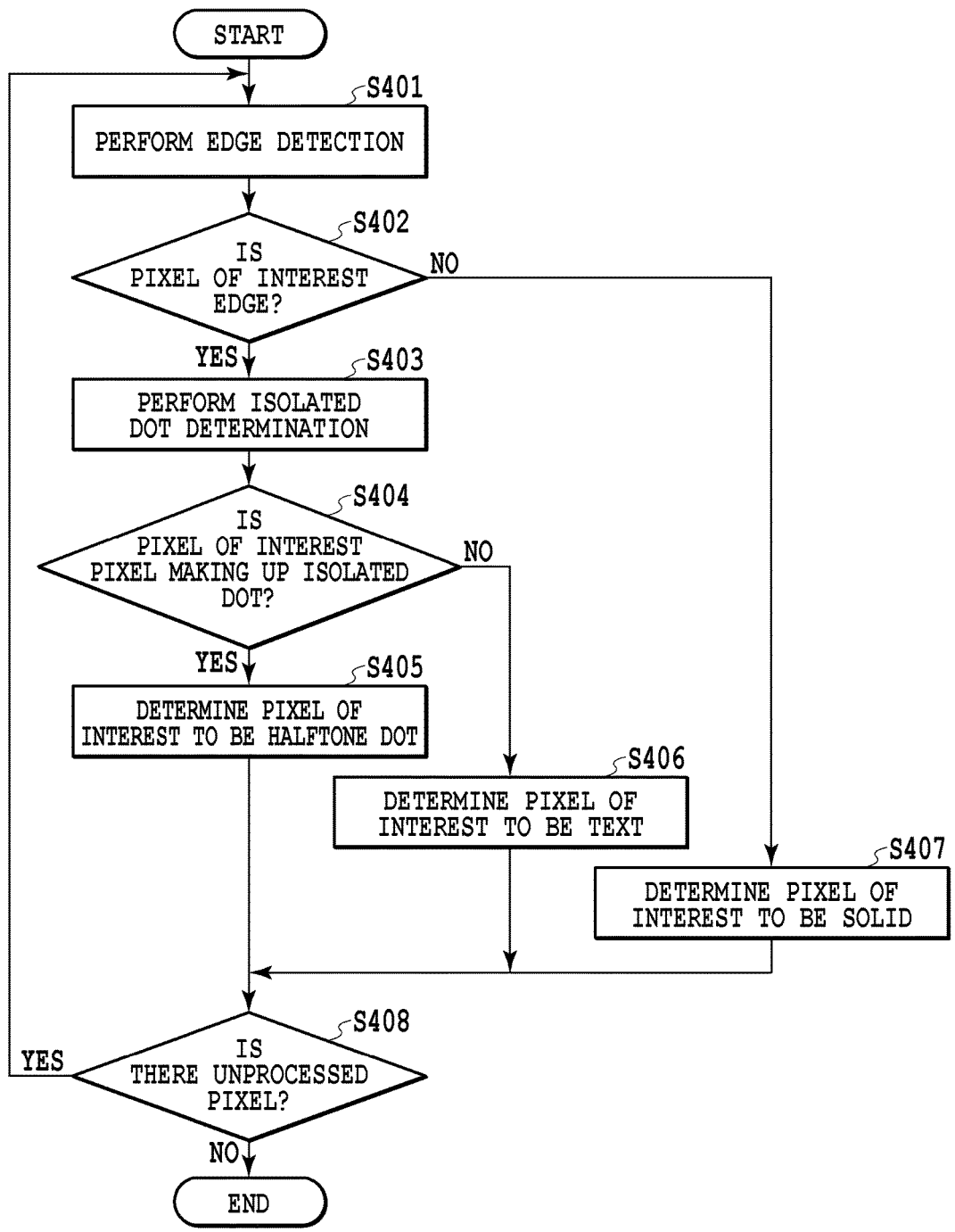
FIG. 4 is a flowchart showing details of image area determination processing.

FIG. 4 is a flowchart showing details of the image area determination processing.

Figure 5C:
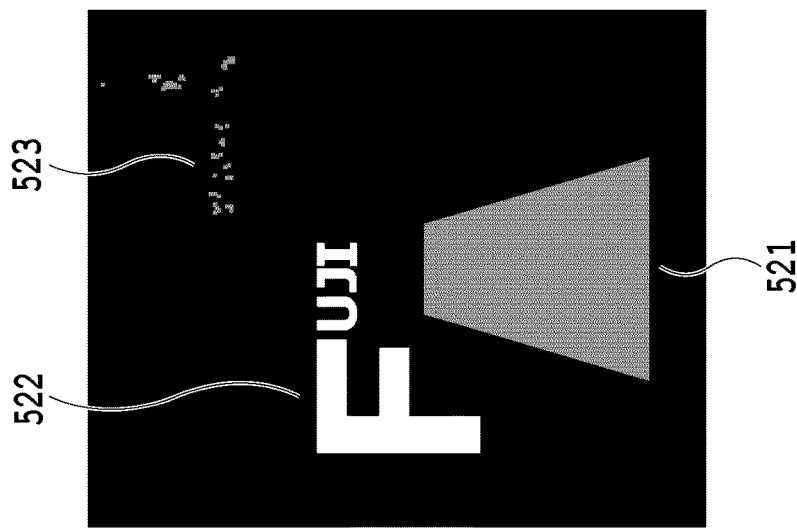
FIG. 5C shows an example of an image area image.
Figure 5B:
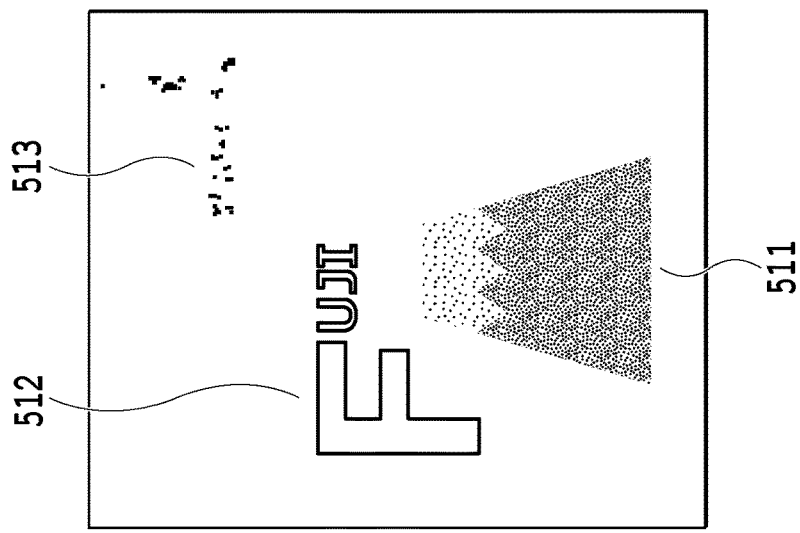
FIG. 5B shows an edge image.
Figure 5A:
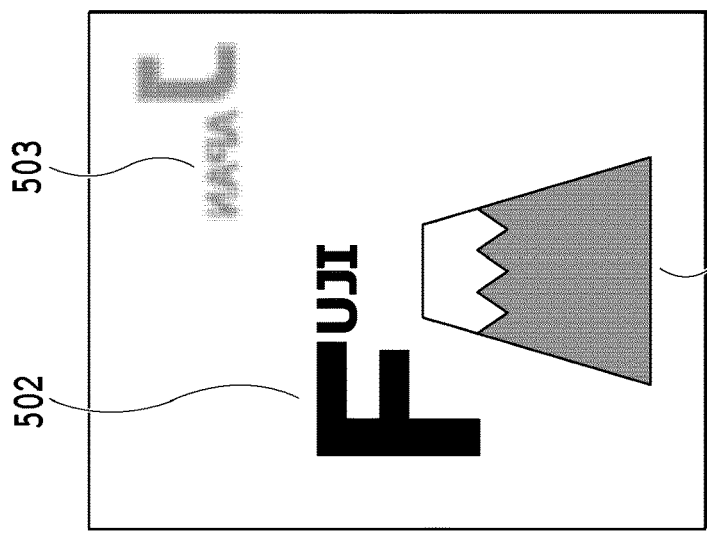
FIG. 5A shows an input scanned image.

At step 401, edge detection is performed for an arbitrary pixel of interest within the input scanned image. It is possible to use a publicly known method for edge detection and for example, there is processing as follows, although details are omitted. First, the edge intensity of each pixel is obtained by performing differential filter processing for the luminance component of the input scanned image. Then, an edge image is generated by turning a pixel whose obtained edge intensity is higher than or equal to a predetermined threshold value into a black pixel and a pixel whose edge intensity is lower than the predetermined threshold value into a white pixel. FIG. 5A is an example of the input scanned image and FIG. 5B shows an edge image thereof. Within the scanned image shown in FIG. 5A, as original objects, a photo area 501 of Mt. Fuji and a text area 502 including text of the alphabet of "Fuji" exist. In addition to these, within the scanned image shown in FIG. 5A, a show-through area 503 in which the text "Japan" on the backside shows through exists. Then, in the edge image shown in FIG. 5B, the portion determined to be an edge of the photo area 501 is represented by a dot group 511 and the portion of the edge determined to be an edge of the text area 502 is represented by a line 512. Further, the portion determined to be an edge of the show-through area 503 is represented by a dot group 513.

At step 402, in accordance with the results of the edge detection, the processing is branched. In the case where the pixel of interest is a pixel making up an edge, the processing proceeds to step 403. On the other hand, in the case where the pixel of interest is not a pixel making up an edge, the processing proceeds to step 407. At this time, it may also be possible to perform the determination of whether the pixel of interest is an edge by, for example, comparing the edge intensity with a predetermined threshold value, in addition to using the above-described edge image.

At step 403, isolated dot determination to determine whether the pixel of interest determined to be an edge is a halftone dot is performed. As a method of the isolated dot determination, for example, mention is made of pattern matching in which, for example, whether a predetermined reference area (e.g., 5×5 pixels) with the pixel of interest as a center matches with a predetermined pattern is checked. It may be possible to appropriately set the pattern at this time by taking into consideration the density of a halftone dot desired to be detected, the screen line number, the shape of the screen, etc. The dot shape of a halftone dot changes depending on the density, and therefore, it may also be possible to design the method so as to be capable of determining a halftone dot area even in the case where the pattern does not match with the predetermined pattern perfectly. The pattern matching is an example of the isolated dot determination method and the method is not limited to this.

At step 404, in accordance with the results of the isolated dot determination, the processing is branched. In the case where the pixel of interest is a pixel making up an isolated dot, the processing proceeds to step 405. On the other hand, in the case where the pixel of interest is not a pixel making up an isolated dot, the processing proceeds to step 406.

Then, at step 405, the pixel of interest is determined to be a pixel with a halftone dot attribute, at step 406, the pixel of interest is determined to be a pixel with a text attribute, and at step 407, the pixel of interest is determined to be a pixel with a solid attribute. Then, as image area information, a flag (halftone dot flag, text flag, solid flag) indicating an attribute in accordance with the determination results is generated for each pixel.

At step 408, whether there is an unprocessed pixel within the scanned image and in the case where there is an unprocessed pixel, the processing returns to step 401. Then, the next pixel is set as the pixel of interest and the processing at step 401 and the subsequent steps is repeated. On the other hand, in the case where the processing has been completed for all the pixels within the scanned image, the present processing is terminated. FIG. 5C is an image (image area image) representing the image area information on all the pixels. In the image area image in FIG. 5C, a gray trapezoid area 521 indicates a pixel (pixel with halftone dot flag ON) area determined to be a halftone dot, corresponding to the photo area 501. Further, an area 522 representing "Fuji" in solid white indicates a pixel (pixel with text flag ON) determined to be text, corresponding to the text area 502. Furthermore, a group of a plurality of gray dots 523 indicates a set of a pixel (pixel with halftone dot flag ON) group in which part of the show-through area 503 where the text "Japan" on the backside shows through is determined to be a halftone dot. In the image area image in FIG. 5C, the other black area is a pixel (pixel with solid flag ON) area determined to be solid, corresponding to the background color (white in this case) portion of the sheet. There is a case where the periphery of the text is determined to be text depending on the thickness of the text and the inside of the text is determined to be solid in the area 522.

The above is the contents of the image area determination processing. Explanation is returned to the flowchart in FIG. 3.

At step 302, the saturation determination processing unit 202 performs the processing (saturation determination processing) to generate saturation information about each pixel of the scanned image.

<Saturation Determination Processing>

Figure 6:
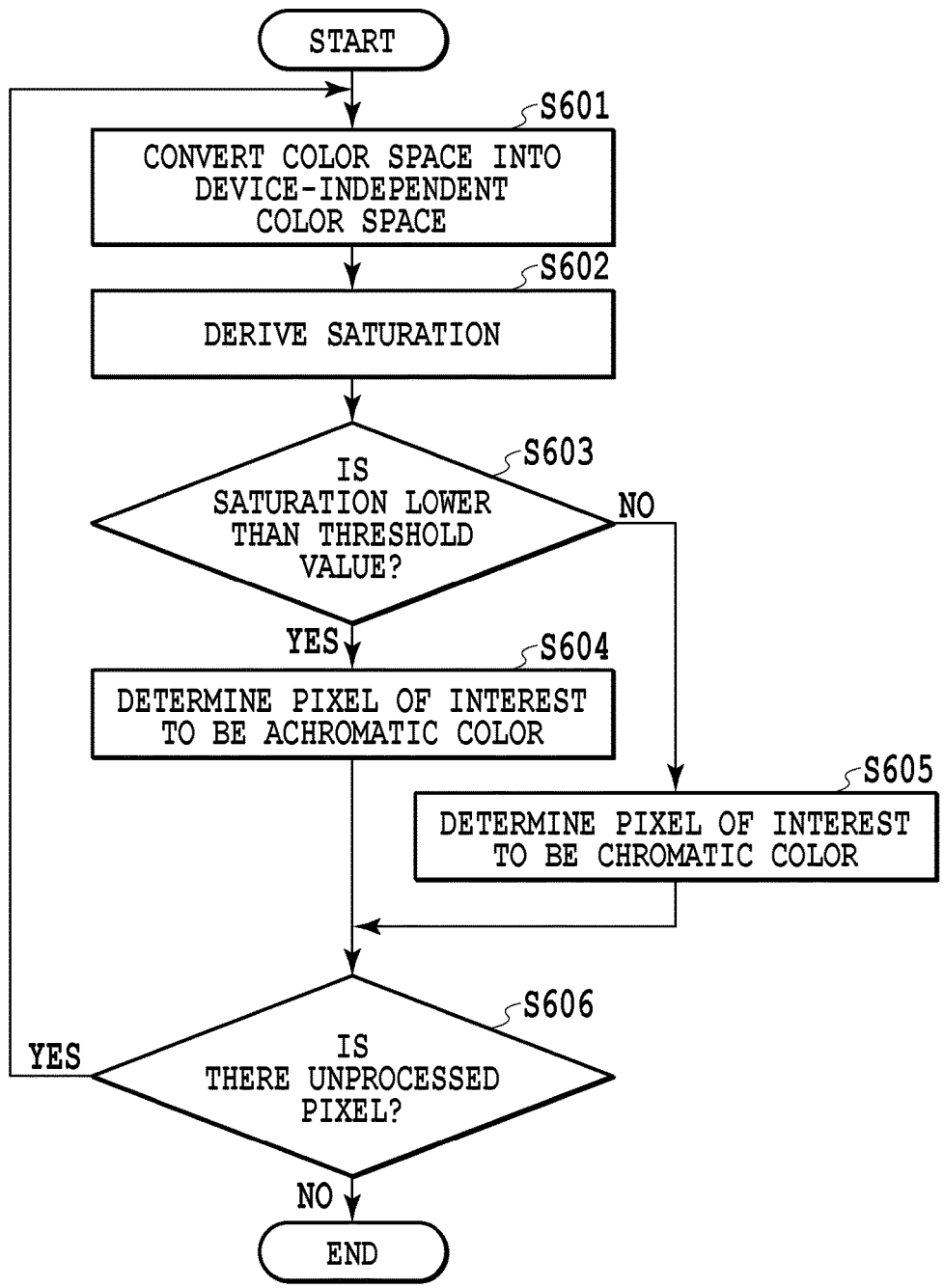
FIG. 6 is a flowchart showing details of saturation determination processing.

FIG. 6 is a flowchart showing details of the saturation determination processing.

At step 601, the current color space (here, RGB) dependent on the input side device (scanner unit 104) is converted into the color space (here, L*a*b*) not dependent on the device for an arbitrary pixel of interest within the input scanned image.

At step 602, from the L*a*b* value after the conversion, saturation C* is derived. For the derivation of the saturation C* from the L*a*b* value, for example, expression (1) below is used.

$$C^* = \sqrt{(a^*)^2 + (b^*)^2} \qquad \text{Expression (1)}$$

At step 603, whether the pixel of interest is a chromatic or an achromatic color is determined by comparing the derived saturation C* with a threshold value determined in advance. Here, an achromatic color in a strict meaning refers to a color (black to gray to white) that has only lightness and whose hue and saturation are zero. However, an achromatic color referred to in the present specification means a color (all the dull colors to be removed as show-through or the like) whose saturation is less than a fixed value as described above. Consequently, it may also be possible to change the threshold value that is used to determine whether a chromatic color or an achromatic color for each hue or in accordance with lightness. For example, a range of an achromatic color is set by taking into consideration the saturation of a color that shows through, the color of impurities included in recycled paper or waste paper, etc., and then a threshold value in accordance with the range may be determined. In the case where the derived saturation C* is less than a predetermined threshold value, the processing proceeds to step 604. On the other hand, in the case where the derived saturation C* is greater than or equal to the predetermined threshold value, the processing proceeds to step 605.

Then, at step 604, the pixel of interest is determined to be an achromatic color and at step 605, the pixel of interest is determined to be a chromatic color.

At step 605, whether there is an unprocessed pixel within the scanned image is determined and in the case where there is an unprocessed pixel, the processing returns to step 601. Then, the next pixel is set as the pixel of interest and the processing at step 601 and the subsequent steps is repeated. On the other hand, in the case where the processing has been completed for all the pixels within the scanned image, the present processing is terminated. At step 601 described above, the color space is converted from the RGB color space into the L*a*b* color space, but the color space after the conversion may be any color space provided that the color space is device-independent, and for example, another color space, such as Lch, may be accepted. In this case, it is needless to say that the contents at each step after step 602 and the subsequent steps are appropriately changed in accordance with the color space after the conversion. What is required is the ability to determine whether a color is an achromatic color to be removed.

The above is the contents of the saturation determination processing. Explanation is returned to the flowchart in FIG. 3.

At step 303, the unnecessary background measure determination processing unit 203 performs the determination processing (unnecessary background measure determination processing) to determine whether to perform a measure to remove an unnecessary background by using the results of the image area determination processing at step 301 and the results of the saturation determination processing at step 302.

<Unnecessary Background Measure Determination Processing>

Figure 7:
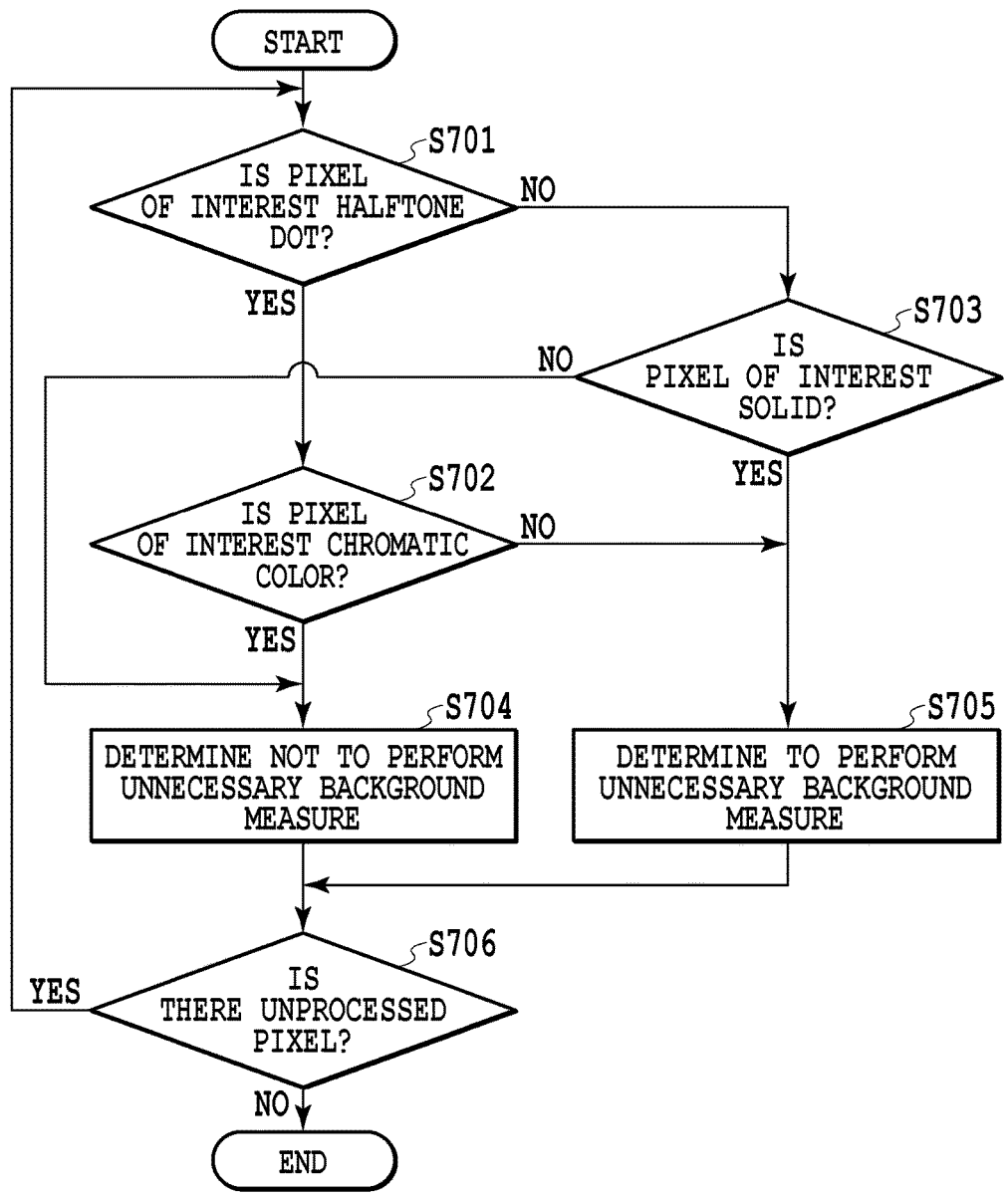
FIG. 7 is a flowchart showing details of unnecessary background measure determination processing.

FIG. 7 is a flowchart showing details of the unnecessary background measure determination processing.

At step 701, based on the image area information described previously, whether an arbitrary pixel of interest within the input scanned image is a halftone dot is determined. Specifically, whether the pixel of interest is a pixel making up a halftone dot is determined by using the image area image described previously (see FIG. 5C). In the case where the pixel of interest is a halftone dot, the processing proceeds to step 702. On the other hand, in the case where the pixel of interest is not a halftone dot, the processing proceeds to step 703.

At step 702, based on the saturation information described previously, whether the pixel of interest is a chromatic color or an achromatic color is determined. In the case where the pixel of interest is a chromatic color, the processing proceeds to step 704. On the other hand, in the case where the pixel of interest is an achromatic color, the processing proceeds to step 705.

At step 703, based on the image area information described previously, whether the pixel of interest is solid is determined. Specifically, whether the pixel of interest is a pixel making up a solid portion is determined by using the image area image described previously (see FIG. 5C). In the case where the pixel of interest is solid, the processing proceeds to step 705. On the other hand, in the case where the pixel of interest is not solid (i.e., in the case of text), the processing proceeds to step 704.

At step 704 in the case where the pixel of interest is determined to be a halftone dot and a chromatic color and in the case where the pixel of interest is determined to be text, it is determined not to perform a measure against show-through. The reason is that the area that is a halftone dot and a chromatic color is a color highlight area of the foreground, and therefore, the area should be reproduced faithfully and in the case of a text area, it is necessary to maintain legibility, and therefore, it is desirable to leave the image information as it is in each case.

On the other hand, at step 705 in the case where the pixel of interest is determined to be a halftone dot and an achromatic color, it is determined to perform the measure against show-through. The reason is that there is a strong possibility that the area that is a halftone dot and an achromatic color is the area, which is part of the show-through area determined to be a halftone dot, or that the area is an unnecessary background color, and therefore, it is desirable to remove as much as possible.

Then, at steps 704 and 705, a signal (e.g., control flag) to control whether or not to perform the measure against show-through in accordance with the determined contents is generated for the pixel of interest and the signal is sent to a processing unit (in the present embodiment, the background removal processing unit 204) configured to perform a measure against show-through.

At step 706, whether there is an unprocessed pixel within the scanned image is determined and in the case where there is an unprocessed pixel, the processing returns to step 701. Then, the next pixel is set as the pixel of interest and the processing at step 701 and the subsequent steps is repeated. On the other hand, in the case where the processing has been completed for all the pixels within the scanned image, the present processing is terminated.

The above is the contents of the unnecessary background measure determination processing. Explanation is returned to the flowchart in FIG. 3.

Figure 8:
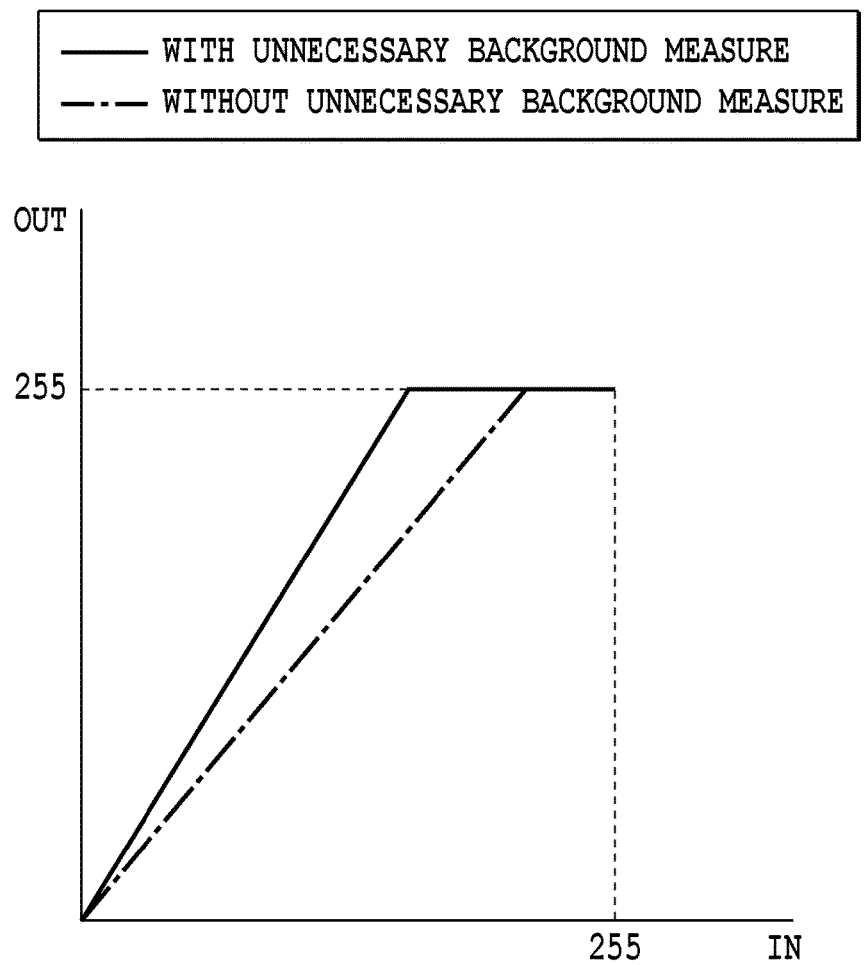
FIG. 8 is an example of a one dimensional Look Up Table that is used for background removal processing according to a first embodiment.

At step 304, the background removal processing unit 204 performs the background removal processing for the pixel of interest in accordance with the results (in the present embodiment, measure control flag) of the unnecessary background measure determination processing. Specifically, in the case where the measure control flag is ON, the processing using a 1D-LUT whose effect of background removal has been amplified is performed. In the case where the measure control flag is OFF, the background removal processing using a common 1D-LUT is performed. FIG. 8 is a diagram showing an example of the 1D-LUT that is used for the background removal processing. The background removal processing is performed in the color space (here, RGB) of the scanned image. In FIG. 8, the horizontal axis represents the input pixel value (RGB value) and the vertical axis represents the output pixel value (RGB value). Then, the solid line indicates a 1D-LUT with an unnecessary background measure that is used in the case where the measure control flag is ON and the one-dot chain line indicates a common 1D-LUT that is used in the case where the measure control flag is OFF. In the case of the 1D-LUT with an unnecessary background measure, it is known that the output value reaches the value (255) indicating white in the stage earlier than that of the common 1D-LUT, indicating more amplification of the background removal effect (lightness is increased). The background removal intensity with/without an unnecessary background measure is determined in advance and the pixel value of each of RGB is converted by using these 1D-LUTs. It may also be possible for the background removal level of the 1D-LUT to be common to each color of RGB or to prepare a different background removal level for each color. However, in the case where the background removal level is changed for each of RGB, the balance of color is lost, and therefore, normally, the background removal level is common to each of RGB. It may also be possible to prepare a plurality of intensities for the 1D-LUT with an unnecessary background measure which is used in the case where the measure control flag is ON and to switch the intensities of the 1D-LUT to be used in accordance with the level of the unnecessary background measure that is set by a user. Further, in place of using the 1D-LUT whose background removal effect has been amplified, it may also be possible to perform processing to replace the color value of the pixel whose measure control flag is ON with a color value, such as white, determined in advance.

At step 305, the color conversion processing unit 205 converts the color space (RGB) of the scanned image for which the background removal processing has been performed in accordance with the measure control flag into the color space (CMYK) compatible with the printing processing in the printer unit 106. For this conversion, for example, a 3D-LUT (three-dimensional lookup table) in which the input value (RGB) and the output value (CMYK) are associated with each other is used.

At step 306, the gradation correction processing unit 206 corrects the tone level of each color of CMYK in accordance with the gradation characteristics of the printer unit 106 for the scanned image whose color space has been converted into the color space (CMYK) compatible with the printer unit 106.

At step 307, the halftone processing unit 207 performs the halftone processing by a predetermined method, such as the dither method and the error diffusion method, and generates halftone image data (print data) having the number of tone levels that can be represented by the printer unit 106.

The above is the flow of the processing to generate print data from scanned image data in the image processing unit 105 according to the present embodiment. The generated print data is output to the printer unit 106 or the like and subjected to the printing processing.

In the present embodiment, the example is explained in which whether or not to perform the measure against show-through is controlled for each pixel, but it may also be possible to perform the control for each predetermined area. As shown in FIGS. 5A to 5C described previously, in the case of the photo area 501 or the graphics area (not shown schematically), the halftone dot flag is set continuously. On the other hand, in the case where part of the show-through area 503 is erroneously determined to be a halftone dot, the halftone dot flag is not stable and appears discretely depending on the degree of show-through and unevenness in reading at the time of scan. Consequently, it may also be possible to analyze image area information for each predetermined area and not to perform the unnecessary background measure by taking the predetermined area to be the foreground area that should be reproduced faithfully in the case where the halftone dot flag is set in the entire predetermined area, or to perform the unnecessary background measure only in the case where the halftone dot flag is set discretely.

As above, according to the present embodiment, the background removal processing whose effect has been amplified is performed as an unnecessary background measure only for the area that is a halftone dot and an achromatic color within the scanned image. Due to this, it is possible to remove an unnecessary background, such as a show-through portion, while securing reproducibility of a color highlight area at the time of copying a document.

[Second Embodiment]

In the first embodiment, the aspect is explained in which the background removal processing whose effect has been amplified is performed as an unnecessary background measure. Next, an aspect is explained as a second embodiment in which the unnecessary background measure is implemented in color conversion processing. Explanation of the contents in common to those of the first embodiment is omitted or simplified and here, the different point is explained mainly.

In the present embodiment, the unnecessary background measure is performed by the color conversion unit 205 configured to convert a color space into a color space compatible with the printer unit 106. Consequently, the measure control information (measure control flag), which is the results of the determination by the unnecessary background measure determination processing unit 203, is sent to the color conversion processing unit 205 in the present embodiment. In FIG. 2 described previously, the broken line arrow extending from the unnecessary background measure determination processing unit 203 toward the color conversion processing unit 205 represents this.

Figure 9:
FIG. 9 is an example of a three dimensional Look Up Table that is used for color conversion processing according to a second embodiment.

Then, in the color conversion processing unit 205, the 3D-LUT that is used for color conversion processing is switched to another in accordance with the measure control flag. Specifically, output values with which the signal value in the vicinity of the gray axis becomes a value indicating higher brightness are prepared for the unnecessary background measure separately from the output values at the normal time and for the pixel of interest whose measure control flag is ON, the color conversion processing unit 205 is caused to select the output values for the unnecessary background measure as the values after the conversion. FIG. 9 is an example of the 3D-LUT that is used for the color conversion processing according to the present embodiment. In the 3D-LUT in FIG. 9, a column 901 shows input values of RGB, a column 902 shows output values at the normal time (without unnecessary background measure), which are selected in the case where the measure control flag is OFF, and a column 903 shows output values with an unnecessary background measure, which are selected in the case where the measure control flag is ON. In this example, in the case of the output values with an unnecessary background measure, in the stage where the RGB values, which are input values, exceed "200", all the CMYK values, which are output values, are specified to be "0", and therefore, it is known that a color is more likely to be converted into white compared to the normal time (lightness increases). In the case where corresponding input values do not exist within the 3D-LUT, it may be possible to find input values by the publicly known interpolation processing.

As above, by the present embodiment also, it is possible to remove an unnecessary background, such as a show-through portion, while securing reproducibility of a color highlight area at the time of copying a document.

[Other Embodiments]

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the present invention, it is possible to remove an unnecessary background portion, such as a show-through portion, without leaving the unnecessary background portion as unevenness even in the case where the unnecessary background portion is determined to be a halftone dot.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-004764, filed Jan. 13, 2016, which is hereby incorporated by reference wherein in its entirety.

What is claimed is:

1. An image processing apparatus comprising:
   (a) a first determination unit configured to determine an attribute of an area included in an input image obtained by reading a document;
   (b) a second determination unit configured to determine saturation of an area determined to be a halftone dot area by the first determination unit; and
   (c) a background removal unit configured to remove a background included in the input image, wherein the background removal unit converts:
      (i) for an area determined to be a halftone dot area by the first determination unit and whose value indicating saturation is determined to be less than a predetermined value by the second determination unit, a color of a pixel of pixels making up the area, which has a pixel value greater than a first level, into white, and
      (ii) for an area determined to be a halftone dot area by the first determination unit and whose value indicating saturation is determined to be greater than or equal to the predetermined value by the second determination unit, a color of a pixel of pixels making up the area, which has a pixel value greater than a second level, into white, and
   wherein a pixel value specified by the first level is less than a pixel value specified by the second level, and
   wherein the first determination unit, the second determination unit, and the background removal unit are implemented by at least one processor or at least one circuit.

2. The image processing apparatus according to claim 1, wherein the background removal unit does not perform removal of a background for an area determined to be a halftone dot area for each predetermined area consisting of a plurality of pixels.

3. The image processing apparatus according to claim 1, wherein the first determination unit detects an edge within the input image and determines, in a case when a pixel of interest within the input image is a pixel making up the edge and a pixel making up an isolated dot, the pixel of interest to be a halftone dot area.

4. The image processing apparatus according to claim 1, wherein the second determination unit determines saturation of an area determined to be a halftone dot area by the first determination unit by converting a color space of the input image into a device-independent color space and by comparing saturation derived from a color value after conversion with a threshold value determined in advance.

5. The image processing apparatus according to claim 4, wherein the threshold value is determined for each hue or in accordance with lightness.

6. An image processing method comprising:
   a first determination step of determining, by a processor or a circuit, an attribute of an area included in an input image obtained by reading a document;
   a second determination step of determining, by a processor or a circuit, saturation of an area determined to be a halftone dot area at the first determination step; and
   a background removal step of removing, by a processor or a circuit, a background included in the input image, wherein, in the background removal step:
      (i) for an area determined to be a halftone dot area at the first determination step and whose value indicating saturation is determined to be less than a predetermined value at the second determination step, a color of a pixel of pixels making up the area, which has a pixel value greater than a first level, is converted into white by a processor or a circuit; and
      (ii) for an area determined to be a halftone dot area at the first determination step and whose value indicating saturation is determined to be greater than or equal to a predetermined value at the second determination step, a color of a pixel of pixels making up the area, which has a pixel value greater than a second level, is converted into white by a processor or a circuit,
   wherein a pixel value specified by the first level is less than a pixel value specified by the second level.

7. A non-transitory computer readable storage medium storing a program for performing an image processing method comprising:
   a first determination step of determining, by a processor or a circuit, an attribute of an area included in an input image obtained by reading a document;
   a second determination step of determining, by a processor or a circuit, saturation of an area determined to be a halftone dot area at the first determination step; and a background removal step of removing a background included in the input image, where in, the background removal step:
  (i) for an area determined to be a halftone dot area at the first determination step and whose value indicating saturation is determined to be less than a predetermined value at the second determination step, a color of a pixel of pixels making up the area, which has a pixel value greater than a first level, is converted into white by a processor or a circuit; and
  (ii) for an area determined to be a halftone dot area at the first determination step and whose value indicating saturation is determined to be greater than or equal to a predetermined value at the second determination step, a color of a pixel of pixels making up the area, which has a pixel value greater than a second level, is converted into white by a processor or a circuit,
wherein a pixel value specified by the first level is less than a pixel value specified by the second level.

* * * * *